(12) United States Patent
Yi et al.

(10) Patent No.: US 10,750,464 B2
(45) Date of Patent: Aug. 18, 2020

(54) METHOD AND APPARATUS FOR SUPPORTING TIME DIVISION DUPLEX FOR CELLULAR INTERNET-OF-THINGS IN WIRELESS COMMUNICATION SYSTEM

(71) Applicant: LG ELECTRONICS INC., Seoul (KR)

(72) Inventors: Yunjung Yi, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 15/580,672

(22) PCT Filed: Jun. 13, 2016

(86) PCT No.: PCT/KR2016/006230
§ 371 (c)(1),
(2) Date: Dec. 7, 2017

(87) PCT Pub. No.: WO2016/200229
PCT Pub. Date: Dec. 15, 2016

(65) Prior Publication Data
US 2018/0192419 A1   Jul. 5, 2018

Related U.S. Application Data

(60) Provisional application No. 62/173,972, filed on Jun. 11, 2015.

(51) Int. Cl.
H04L 29/08    (2006.01)
H04L 29/06    (2006.01)
(Continued)

(52) U.S. Cl.
CPC ............ *H04W 56/003* (2013.01); *H04B 7/26* (2013.01); *H04B 7/2656* (2013.01); *H04L 5/14* (2013.01);
(Continued)

(58) Field of Classification Search
CPC ............ H04W 48/12; H04W 72/0453; H04W 56/003; H04L 5/0037; H04L 67/12; H04L 25/03821
See application file for complete search history.

(56) References Cited

U.S. PATENT DOCUMENTS 9,295,048 B2 * 3/2016 Malladi .............. H04W 72/042
2012/0294163 A1 * 11/2012 Turtinen ............. H04W 72/042
370/252

(Continued)

OTHER PUBLICATIONS

PCT International Application No. PCT/KR2016/006230, Written Opinion of the International Searching Authority dated Sep. 6, 2016, 30 pages.

(Continued)

*Primary Examiner* — Omer S Mian
(74) *Attorney, Agent, or Firm* — Lee, Hong, Degerman, Kang & Waimey

(57) ABSTRACT

A method and apparatus for performing cellular internet-of-things (CIoT) transmission in a wireless communication system is provided. A base station (BS) configures a frame in a CIoT carrier which is adjacent to a time division duplex (TDD) long-term evolution (LTE) carrier, and performs the CIoT transmission using the frame in the CIoT carrier. A downlink (DL) of the CIoT carrier may be adjacent to the TDD LTE carrier. Or, a DL and an uplink (UL) of the CIoT carrier may be adjacent to the TDD LTE carrier.

15 Claims, 12 Drawing Sheets

(51) Int. Cl.
  *H04W 52/18* (2009.01)
  *H04W 56/00* (2009.01)
  *H04B 7/26* (2006.01)
  *H04L 25/03* (2006.01)
  *H04L 5/14* (2006.01)
  *H04W 88/06* (2009.01)
  *H04W 4/70* (2018.01)

(52) U.S. Cl.
  CPC ....... *H04L 25/03821* (2013.01); *H04W 52/18* (2013.01); *H04L 67/12* (2013.01); *H04W 4/70* (2018.02); *H04W 56/001* (2013.01); *H04W 88/06* (2013.01)

(56) References Cited

U.S. PATENT DOCUMENTS

| | | |
|---|---|---|
| 2013/0077582 A1 | 3/2013 | Kim et al. |
| 2014/0029568 A1 | 1/2014 | Wang et al. |
| 2014/0341141 A1 | 11/2014 | Nguyen et al. |
| 2014/0342738 A1* | 11/2014 | Ishii ............... H04W 28/08 455/436 |
| 2014/0362831 A1 | 12/2014 | Young |
| 2016/0105860 A1* | 4/2016 | Li .................. H04W 4/70 370/350 |
| 2016/0205692 A1* | 7/2016 | Zhang ............. H04W 48/12 370/329 |
| 2016/0234839 A1* | 8/2016 | Parkvall ........... H04B 7/2656 |

OTHER PUBLICATIONS

Antipolis, "CIoT-Coexistence with LTE and UMTS (update of GPC150182)," 3GPP TSG-GERAN Ad hoc#2, Apr. 2015, 9 pages.

* cited by examiner

METHOD AND APPARATUS FOR SUPPORTING TIME DIVISION DUPLEX FOR CELLULAR INTERNET-OF-THINGS IN WIRELESS COMMUNICATION SYSTEM

CROSS-REFERENCE TO RELATED APPLICATIONS

This application is the National Stage filing under 35 U.S.C. 371 of International Application No. PCT/KR2016/006230, filed on Jun. 13, 2016, which claims the benefit of U.S. Provisional Application No. 62/173,972, filed on Jun. 11, 2015, the contents of which are all hereby incorporated by reference herein in its entirety.

BACKGROUND OF THE INVENTION

Field of the Invention

The present invention relates to wireless communications, and more particularly, to a method and apparatus for supporting time division duplex (TDD) for cellular internet-of-things (CIoT) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Machine-to-machine (M2M) communication represents a significant growth opportunity for the 3GPP ecosystem. To support the so called "Internet-of-things" (IoT), 3GPP operators have to address usage scenarios with devices that are power efficient (with battery life of several years), can be reached in challenging coverage conditions, e.g. indoor and basements and, more importantly, are cheap enough so that they can be deployed on a mass scale and even be disposable.

Cellular IoT (CIoT) devices may require very low throughput, may not have stringent delay requirements like those required for real time services, may not need to support circuit switched services, may not need to support inter-radio access technology (RAT) mobility and may perform intra-RAT mobility by cell reselection. For CIoT, some additional features may be required.

SUMMARY OF THE INVENTION

The present invention provides a method and apparatus for supporting time division duplex (TDD) for cellular internet-of-things (CIoT) in a wireless communication system. The present invention discusses CIoT framework to support TDD in a given frequency.

In an aspect, a method for performing, by a base station (BS), cellular internet-of-things (CIoT) transmission in a wireless communication system is provided. The method includes configuring a frame in a CIoT carrier which is adjacent to a time division duplex (TDD) long-term evolution (LTE) carrier, and performing the CIoT transmission using the frame in the CIoT carrier.

In another aspect, a base station (BS) in a wireless communication system is provided. The BS includes a memory, a transceiver, and a processor coupled to the memory and the transceiver. The processor is configured to configure a frame in a cellular internet-of-things (CIoT) carrier which is adjacent to a time division duplex (TDD) long-term evolution (LTE) carrier, and control the transceiver to perform the CIoT transmission using the frame in the CIoT carrier.

TDD can be supported efficiently in CIoT.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
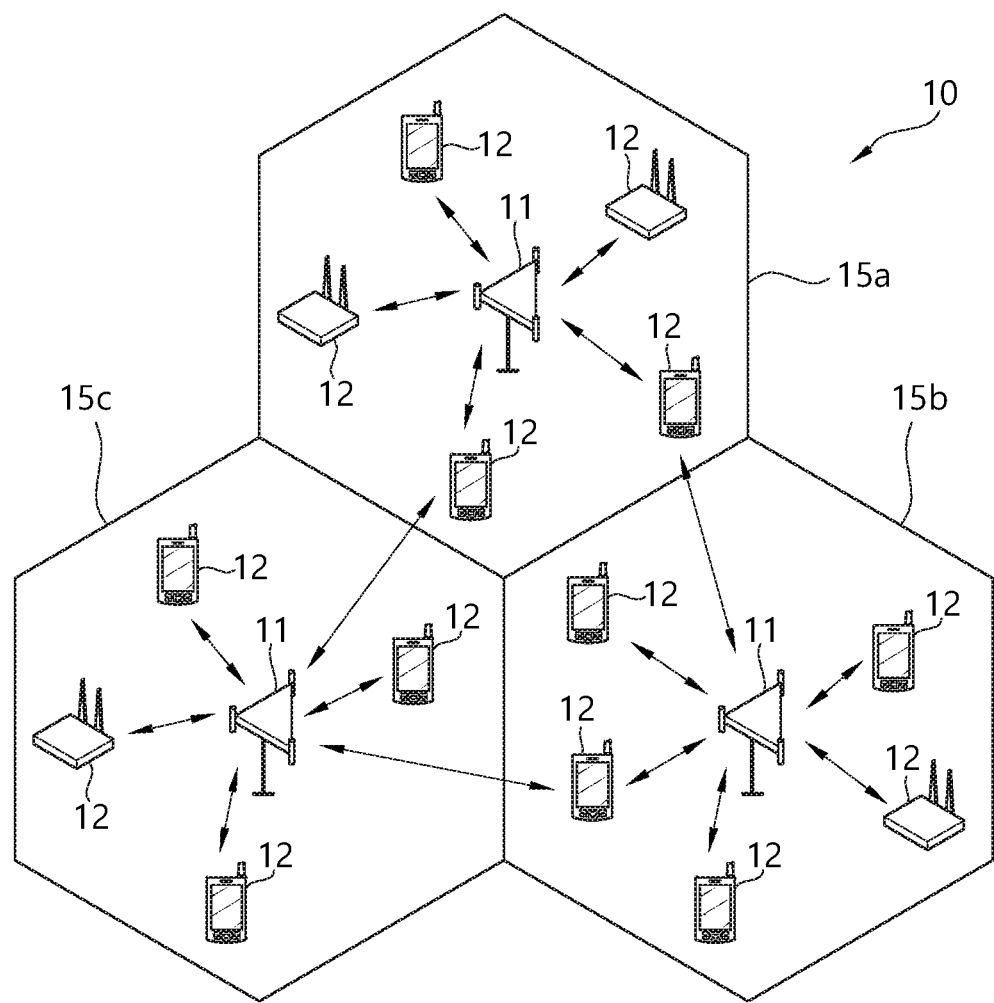
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
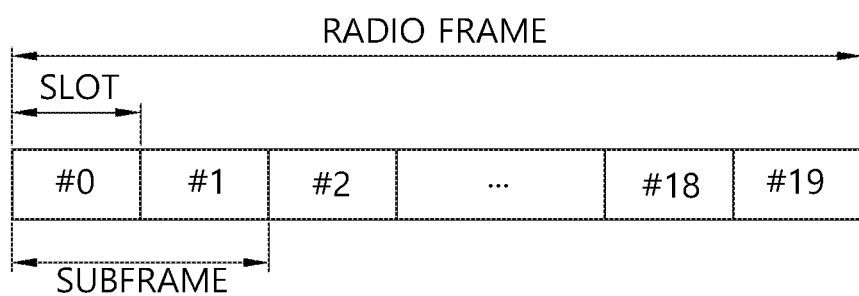
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
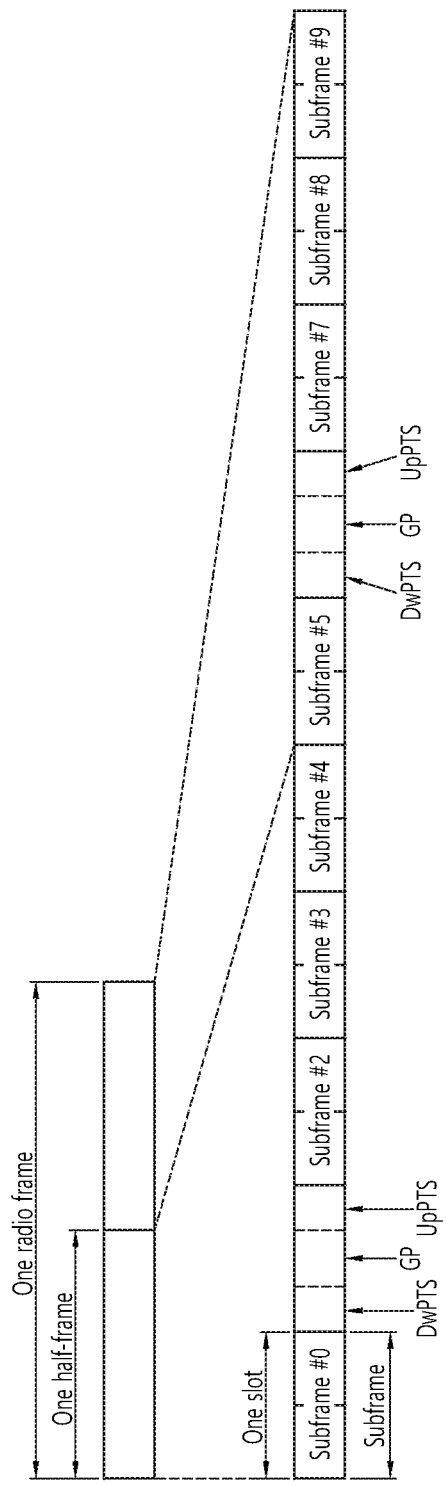
FIG. 3 shows another structure of a radio frame of 3GPP LTE.

FIG. 3 shows another structure of a radio frame of 3GPP LTE. Frame structure described in FIG. 3 is applicable to TDD. Each radio frame of length 10 ms consists of two half-frames of length 5 ms each. Each half-frame consists of five subframes of length 1 ms. Each subframe i is defined as two slots, 2i and 2i+1, of length 0.5 ms each.

The UL-DL configuration in a cell may vary between frames and controls in which subframes UL or DL transmissions may take place in the current frame. The supported UL-DL configurations are listed in Table 1 below.

TABLE 1

| UL-DL configuration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, for each subframe in a radio frame, "D" denotes a DL subframe reserved for DL transmissions, "U" denotes an UL subframe reserved for UL transmissions and "S" denotes a special subframe with the three fields downlink pilot time slot (DwPTS), guard period (GP) and uplink pilot time slot (UpPTS). UL-DL configurations with both 5 ms and 10 ms DL-to-UL switch-point periodicity are supported. In case of 5 ms DL-to-UL switch-point periodicity, the special subframe exists in both half-frames. In case of 10 ms DL-to-UL switch-point periodicity, the special subframe exists in the first half-frame only. Subframes 0 and 5 and DwPTS are always reserved for DL transmission. UpPTS and the subframe immediately following the special subframe are always reserved for UL transmission.

Cellular internet-of-things (CIoT) is described. Performance objectives of CIoT may include improved indoor coverage, support of massive number of low throughput devices, reduced complexity, improved power efficiency, and latency.

For one of physical layer aspects and radio access protocols for clean slate concepts of CIoT, narrowband M2M (narrowband machine-to-machine) may be considered. To support massive number of low throughput machine-type communication (MTC) devices (UEs) with a limited number of 200 kHz resource blocks, each resource block is divided into a large number of narrowband physical channels which are individually modulated and pulse-shaped Channelization is done in a frequency division multiplexed (FDM) manner, for both the UL and the DL.

The DL channelization supports efficient frequency reuse, which is important for maintaining overall system capacity, and low complexity equalization at the UE receiver. It also allows separation of traffic for different UE coverage classes onto different physical channels which allows easier optimization of media access control (MAC) characteristics, such as latency, for each coverage class. The UL channelization provides a very efficient means to improve the UL coverage without compromising the UL capacity. The channel spacing in the uplink is a fraction (e.g. ⅓) of that in the DL. This creates many more physical channels in the UL than in the UL. With a significantly higher number of parallel UL data transmissions, the aggregate UL transmit power increases proportionately, and so does the achievable UL capacity. Other techniques such as symbol rate spreading and burst rate repetition may be employed in both the UL and the DL to further extend the coverage.

The duration of a burst may be variable, and a physical channel may be only defined in the frequency domain, not in the time domain (i.e. there is only one physical channel per carrier). Different types of bursts can be carried on a physical channel, depending on the channel type.

The minimum system bandwidth may be a single resource block. Additional resource blocks can be used to increase network capacity, and can have the additional benefit of providing frequency diversity if they are sufficiently separated in frequency. The choice of resource block bandwidth may allow the system to be deployed by re-farming one or more carriers. However, other deployment options may also be available, such as deploying the system stand-alone in any suitable fragment of spectrum, or potentially within the guard-bands of another system.

The base station may operate in radio frequency (RF) full duplex mode in order to maximize network capacity. MTC devices may operate in half duplex mode to reduce the RF cost.

As described above, to minimize the hardware requirement/cost and battery power of a UE in CIoT, small bandwidth such as 200 kHz devices may be considered. For a new device, a new frame structure and new data scheduling mechanisms may be considered. Mainly, the following two aspects may be considered.

(1) A long duration TTI may be specified. While 1 ms TTI is defined in current LTE, a long TTI such as 10 ms TTI may be defined for a new low complexity UE.

(2) A minimum number of channels/designs may be supported. For example, one channel with different content may be used for different purpose. For example, data channel such as physical downlink shared channel (PDSCH) may be used to transmit data and control information.

In terms of cell association, further simplification may be considered. For example, short broadcast may be transmitted without explicit cell association. Also, measurement requirement may be further relaxed or removed to minimize power consumption. In terms of waveform design, waveform used for GSM, high speed packet access (HSPA) or LTE may be reused. The characteristics of a new system may be the main UE requirement in terms of bandwidth and/or data rate and/or operating signal to interference and noise ratio (SINR) range.

Figure 4:
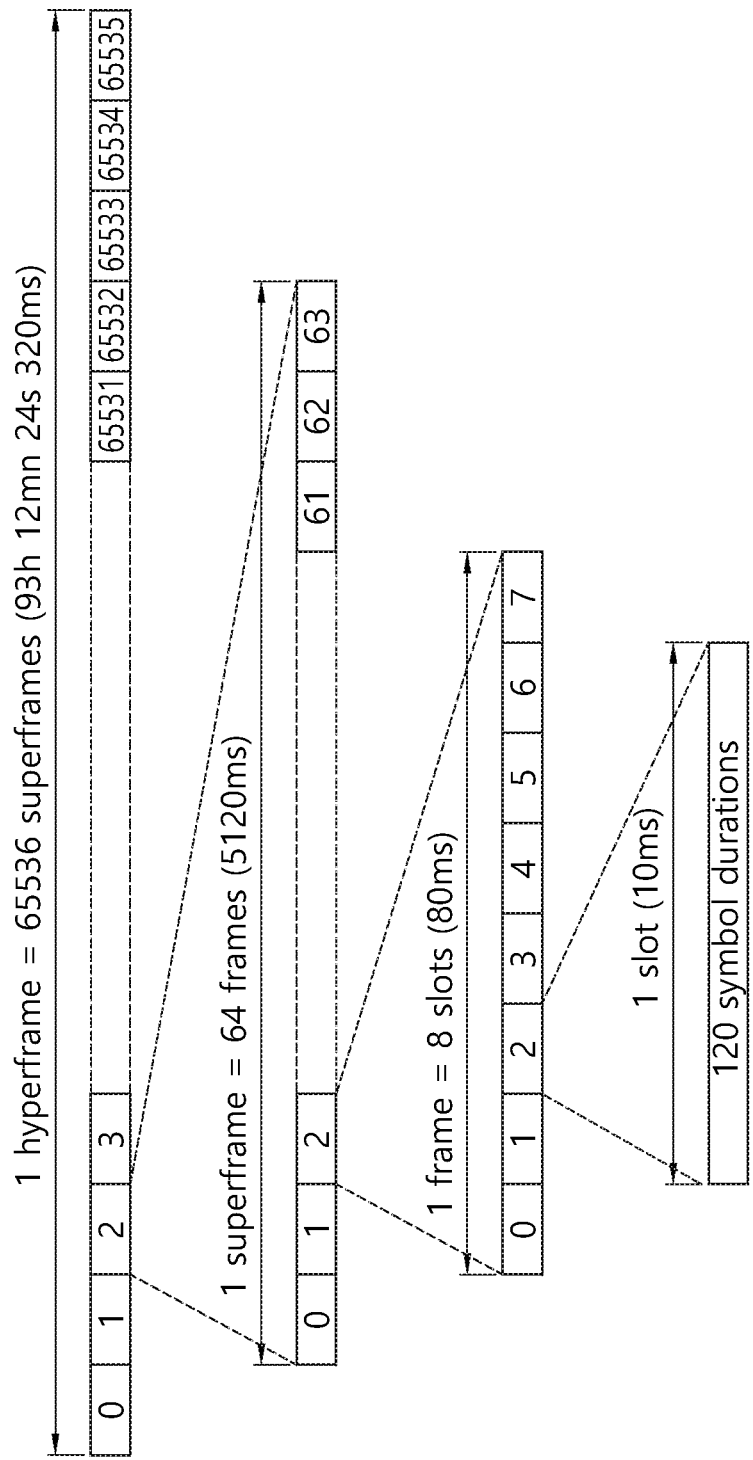
FIG. 4 shows an example of a DL time structure with a long TTI for CIoT.

FIG. 4 shows an example of a DL time structure with a long TTI for CIoT. Referring to FIG. 4, the longest recurrent time period of the time structure is called a hyperframe and has a duration of 335544320 ms (or 93 h 12 mn 24 s 320 ms). One hyperframe is subdivided into 65536 superframes which each have a duration of 5120 ms. Superframes are numbered modulo this hyperframe (superframe number, or SFN, from 0 to 65535). One superframe is subdivided into 64 frames which each have a duration of 80 ms. Frames are numbered modulo this superframe (frame number, or FN, from 0 to 63). A frame is the time unit for transmission of the broadcast signal and synchronization information on physical broadcast and synchronization channel (PBSCH). One frame is also the minimum interval between transmissions of successive downlink control information (DCI) bursts on PDSCH. One frame comprises eight slots which are numbered modulo this frame (slot number, or SN, from 0 to 7). One slot lasts 10 ms and is the minimum scheduling unit on PDSCH. The eight slots in one frame belong to the same physical channel.

The frame structure shown in FIG. 4 above is merely example. The present invention described below is not limited thereto, and may be applied to different frame structure. Generally, to support large coverage, the duration of one TTI in both DL and UL for CIoT may be longer than 1 ms which is used in the current LTE.

Hereinafter, a method for supporting TDD for CIoT according to an embodiment of the present invention is described. The present invention may discusses the following three cases.

(1) Case 1 (TDD operation of a long TTI): Assuming there is only one carrier of such as 200 kHz bandwidth available, how to perform TDD operation needs to be clarified.

(2) Case 2 (CIoT carriers are adjacent each other): Handling of coexistence issue needs to be clarified.

(3) Case 3 (CIoT carrier is adjacent to a legacy LTE carrier): Handing of interference/coexistence issue needs to be clarified.

Hereinafter, an embodiment of the present invention for each case described above is described in detail.

(1) Case 1: TDD Operation of a Long TTI

Upon utilizing the frame structure shown in FIG. 4, TDD DL/UL configuration may be configured. In terms of configuring TDD DL/UL configuration, at least 1 slot may be used for the basic unit. Since 1 frame consists of 8 slots, one possible TDD DL/UL configuration may be "DDDDUUUS2" or "DDDDS1UUS2", where D indicates DL, U indicates full UL, and S2 consists of "UpPTS+gap" and S1 consists of "DwPTS+gap" where the gap is to handle switching from DL to UL and/or timing advance. The gap may be needed to handle the round trip delay that a UE can have. For example, if the round trip delay is 1 ms, the gap may be 1 ms, and any transmission may not occur to handle round trip latency.

Figure 5:
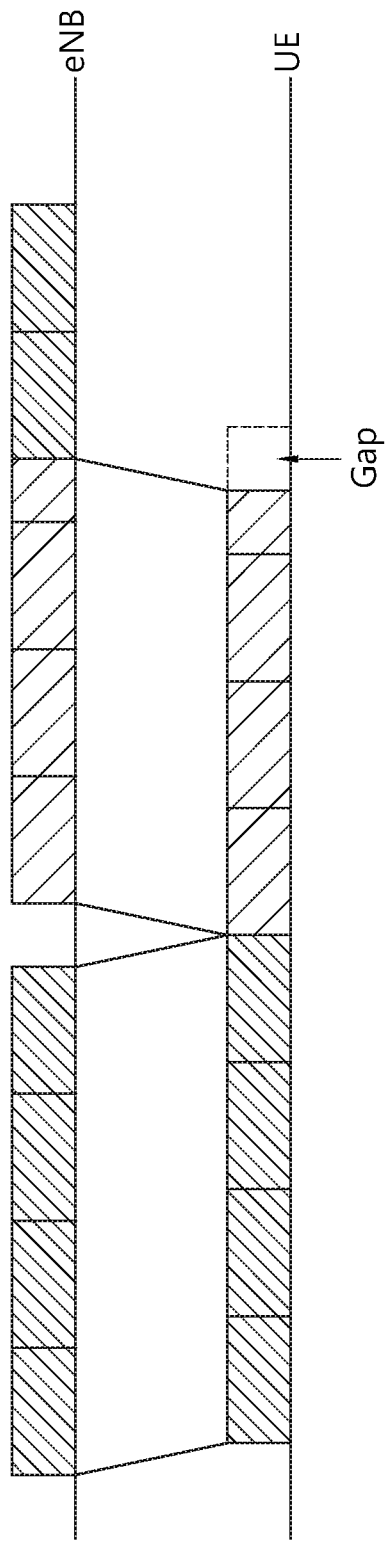
FIG. 5 shows an example of a TDD operation of a long TTI for CIoT according to an embodiment of the present invention.

FIG. 5 shows an example of a TDD operation of a long TTI for CIoT according to an embodiment of the present invention. Different from the current LTE, timing advance (TA) for UL may not be used. If TA is used, as describe above in case 1, another special subframe or gap to support switching from DL to UL and/or timing advance (i.e. S1) may be necessary. For example, referring to FIG. 5, to accommodate/compensate any round trip delay in case TA is not used, the last few symbols may not be used for UL transmission. The length of the gap may be determined based on the maximum round trip delay that the network supports. Thus, similar to the current LTE, the gap length may be configured. The gap may be configured in the first symbols of DL slot as well.

Further, TDD DL/UL configuration may be applied in superframe rather than in frame. In such a case, one length of DL may be 80 ms instead of 10 ms. In other words, switching from DL to UL may occur less frequently compared to 5 ms or 10 ms which is supported by the current LTE. This allows sufficiently large continuous DL and UL subframes or transmission burst. The unit of DL/UL switching may be multiple of 5 ms or 10 ms which may be defined by the numerology or subcarrier spacing that CIoT utilizes. For example, if 3.75 kHz subcarrier spacing is used for CIoT instead of 15 kHz which is used by the current LTE, four times of DL/UL switching may be considered (i.e. every 20 ms or 40 ms). In other words, the subframe length may be increased by four times from the current LTE and the configuration of LTE DL/UL configuration may be applied per subframe level where the subframe length of 3.75 kHz may be 4 ms instead of 1 ms.

(2) Case 2: CIoT Carriers are Adjacent Each Other

In this case, timing synchronization and alignment of TDD DL/UL configuration may be necessary. Utilizing signaling between base stations, some coordination on timing and TDD DL/UL configurations may be assumed. Assuming some basic synchronization, a UE may also be synchronized with the network such that special subframe/slot can consist of DL portion, gap, and UL portion. If UL synchronization is used, TA value may need to be delivered to the UE which can be signaled via DCI or MAC control element (CE)/information element (IE). Further, it may be necessary to align TLL DL/UL configuration as well as the maximum gap assumed in the network.

(3) Case 3: CIoT Carrier is Adjacent to a Legacy LTE Carrier

In this case, various cases may be considered according to a type of CIoT carrier and LTE carrier. Hereinafter, each case is described in detail.

1) Case 3-1: DL of CIoT Carrier is Adjacent to DL of LTE FDD Carrier

In this case, other than usual coexistence issue between adjacent carriers, some other issues may not exist. However, it is considerable that the maximum power on CIoT carrier is relatively large (e.g. 43 dBm over 200 kHz). Thus, leakage/interference from such a high power may be carefully addressed. Accordingly, the maximum power that the network my use depending on the gap between CIoT carrier and LTE FDD carrier may be adapted. Thus, similar to the current LTE, CIoT network may also propagate the maximum power or the power used to transmit synchronization signals. Further, system information may be indicated to UEs such that it may be used for UE's measurement for coverage enhancement level and others, as the UE cannot assume that the network may always use the maximum power. In summary, CIoT network may indicate the power used for synchronization signals which are used by the UE for its measurement such as pathloss measurement and/or signal strength to determine cell quality. Furthermore, if different numerology is used for CIoT carrier and LTE carrier, some interference may be further considered which may complicate cell-specific reference signal (CRS) cancellation and other cancellation property. Thus, necessary power reduction or necessary information exchange among cells to aid cancellation may be considered.

2) Case 3-2: UL of CIoT Carrier is Adjacent to UL of LTE FDD Carrier.

Similar to DL, UL power in CIoT carrier may have higher impact on other adjacent LTE carrier, as the maximum UE power (such as 23 dBm) may be concentrated over very small bandwidth (such as 3.5 kHz). To handle the interference, similar to the current LTE, the network may configure the maximum power the network intends to use for its UL transmission (e.g., PEMAX). A UE's maximum power may not exceed the configured maximum power in any case. Moreover, the different power may be defined per each tone. For example, within the whole system bandwidth of 200 kHz, first 50 kHz may use "PCmax-offset" as the maximum power. For this, the offset of power, the tones/carriers where the offset is applied may be configured. Furthermore, gap between UL of CIoT carrier and DL of LTE FDD carrier may be necessary.

3) Case 3-3: DL/UL of CIoT Carrier is Adjacent to DL of LTE FDD Carrier

For this case, when DL of CIoT carrier collides with LTE carrier, the same issue of case 3-1 described above may be applied. In case UL of CIoT carrier collides with DL of LTE FDD carrier, the performance of UL of CIoT carrier may be degraded. For this, additional repetition factor α may be configured to a UE, and the UE may perform additional repetition or reduce code rate in terms of UL transmission. For example, in a normal case, a UE may transmit one UL transmission over 1 slot, while the UE may transmit one UL transmission over 2 slots with repetition of 2 times if a is configured as 100%.

4) Case 3-4: DL/UL of CIoT Carrier is Adjacent to UL of LTE FDD Carrier

When UL of CIoT carrier collides with LTE carrier, the same issue of case 3-2 described above may be applied. When DL of CIoT carrier collides with UL of LTE FDD carrier, it may have higher impact on LTE UL performance Such a case similar to case 3-1, CIoT cell may reduce its maximum power significantly such that the interference to LTE UL carrier is minimized. For both Case 3-1/3-4, if DL transmission power is reduced, additional repetition may need to be used. Thus, when coverage class is determined, the maximum power that the network is used may be also taken into account. Accordingly, the coverage class/level that each UE will use may be configured via higher layer configuration by the network. Alternatively, a UE may derive the coverage class/level based on the maximum power used by the network which is indicated by the network. For example, if the network indicates the power used for synchronization signal, it may be assumed as the maximum power that the network can utilize for data/control transmission as well.

5) Case 3-5: DL of CIoT Carrier is Adjacent to LTE TDD Carrier

In this case, DL transmission from CIoT cell may affect the performance of UL transmission in LTE TDD carrier. To minimize the interference on UL subframes in LTE TDD carrier, at least one of the following approaches may be considered.

Approach 1: a lower power to minimize the interference on UL of LTE TDD carrier may be considered, which is similar to case 3-4 described above. If this is used, lower power may be used through the entire duration though UL and DL in TDD.

Approach 2: different power may be used in a time duration (e.g. 1 ms) which collides with DL subframe of LTE TDD carrier and another time duration (e.g. 1 ms) which collides with UL subframe of LTE TDD carrier. For example, power P1 may be used for the first time duration and power P2 may be used for the second time duration. Within a slot, P1 and P2 may be used depending on the TDD DL/UL configuration that the adjacent LTE TDD carrier uses. For example, if LTE TDD carrier uses TDD DL/UL configuration 0, "P1P2P2P2P2P1P2P2P2P2" may be used within a slot time duration. In this case, P1 may be larger than P2.

Approach 3: only the time duration which collides with DL subframe and DwPTS of LTE TDD carrier may be utilized for CIoT DL transmission.

Figure 6:
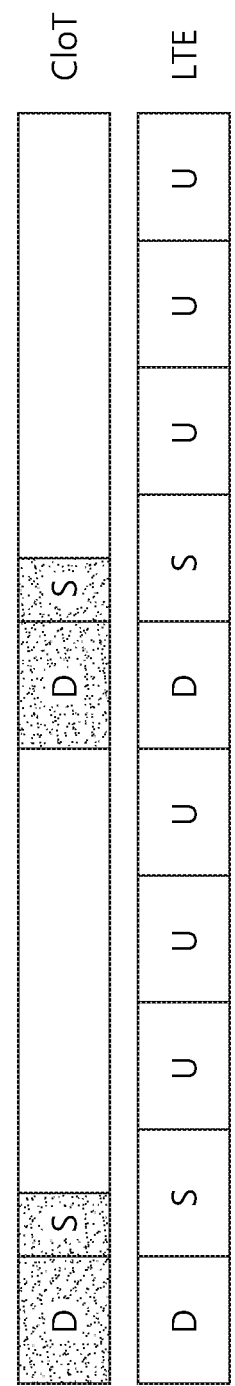
FIG. 6 shows an example of a TDD operation for CIoT according to an embodiment of the present invention.

FIG. 6 shows an example of a TDD operation for CIoT according to an embodiment of the present invention. Referring to FIG. 6, LTE TDD carrier uses TDD DL/UL configuration 0, which corresponds to "DSUUUDSUUU". In this case, DL transmission in CIoT carrier may be only performed in time duration which overlaps with DL subframe and DwPTS of LTE TDD carrier.

6) Case 3-6: UL of CIoT Carrier is Adjacent to LTE TDD Carrier

Similar to other cases, to handle the interference from adjacent LTE TDD carrier, more repetition may be used. Similarly, only the time duration which collides with UL subframe and UpPTS of LTE TDD carrier may be utilized for CIoT UL transmission. In other words, any continuous transmission length may be less than the maximum continuous length.

7) Case 3-7: DL/UL of CIoT Carrier is Adjacent to LTE TDD Carrier

In this case, case 3-5 and 3-6 may be applicable per each region of DL and UL respectively. Alternatively, frame structure of CIoT carrier may be aligned with frame structure of the adjacent LTE TDD carrier. In this case, different frame structure may be defined per each legacy TDD DL/UL configuration. However, this may require new mapping and signal generation as the length may change. Rather, a TDD DL/UL configuration for CIoT carrier may defined based on a long TTI. Accordingly, the interference can be handled via proper power control and/or a gap between CIoT carrier and LTE TDD carrier.

DL subframes may be supported by a TDD DL/UL configuration of the LTE carrier or a TDD DL/UL configuration of the adjacent victim's carrier (similar for UL subframes). In case a UE is scheduled with longer DL subframes than the maximum DL subframes available, from the starting to end of the transmission, UL subframes may be considered as invalid DL subframes (from DL perspective). Similarly, for UL transmission, DL subframes may be considered as invalid UL subframes. Assuming half-duplex CIoT UE, UL and DL transmission burst may take in a turn. In the invalid subframes, transmission may be delayed or dropped.

Figure 7:
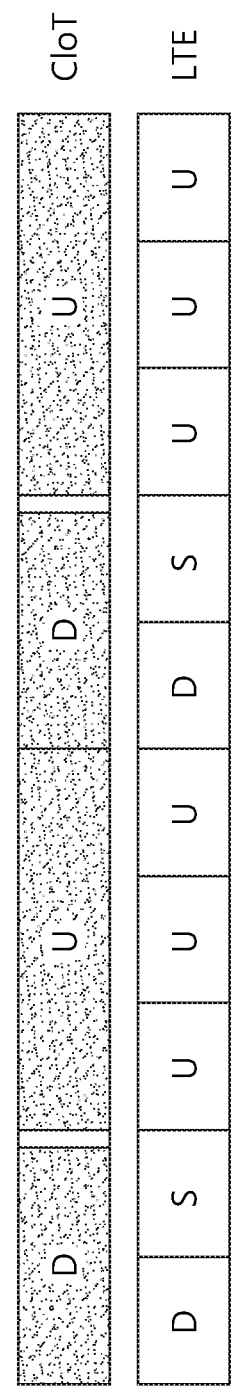
FIG. 7 shows another example of a TDD operation for CIoT according to an embodiment of the present invention.

FIG. 7 shows another example of a TDD operation for CIoT according to an embodiment of the present invention. Referring to FIG. 7, LTE TDD carrier uses TDD DL/UL configuration 0, which corresponds to "DSUUUDSUUU". In this case, frame structure of CIoT carrier is aligned with the LTE TDD carrier with TDD DL/UL configuration 0, i.e. "DUDU".

Figure 8:
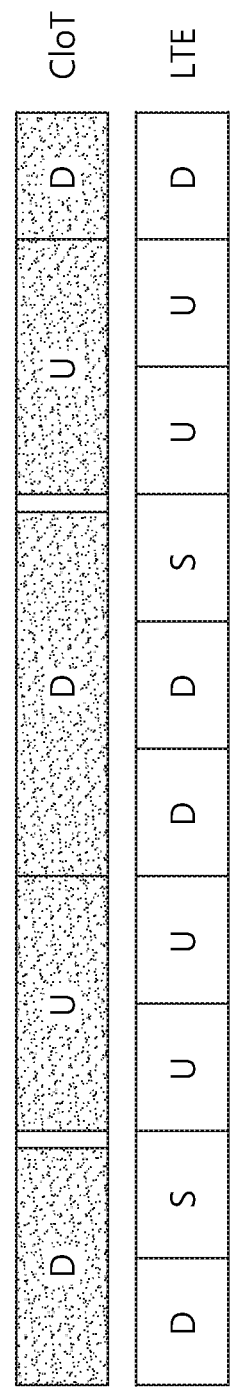
FIG. 8 shows another example of a TDD operation for CIoT according to an embodiment of the present invention.

FIG. 8 shows another example of a TDD operation for CIoT according to an embodiment of the present invention. Referring to FIG. 8, LTE TDD carrier uses TDD DL/UL configuration 1, which corresponds to "DSUUDDSUUD". In this case, frame structure of CIoT carrier is aligned with the LTE TDD carrier with TDD DL/UL configuration 1, i.e. "DUDUD".

Figure 9:
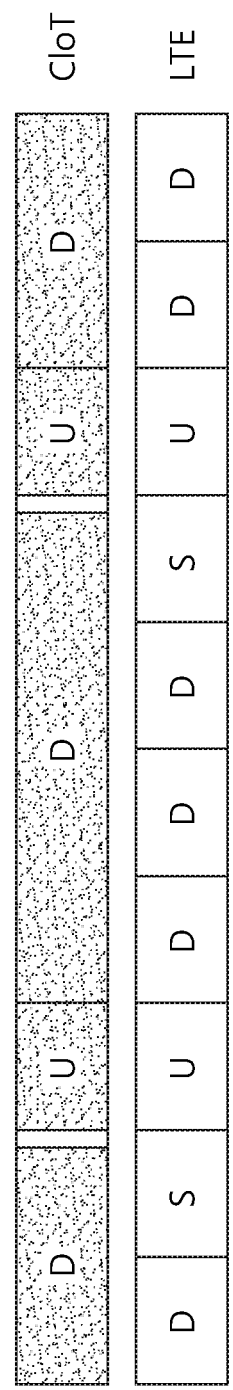
FIG. 9 shows another example of a TDD operation for CIoT according to an embodiment of the present invention.

FIG. 9 shows another example of a TDD operation for CIoT according to an embodiment of the present invention. Referring to FIG. 9, LTE TDD carrier uses TDD DL/UL configuration 2, which corresponds to "DSUDDDSUDD". In this case, frame structure of CIoT carrier is aligned with the LTE TDD carrier with TDD DL/UL configuration 2, i.e. "DUDUD".

Figure 10:
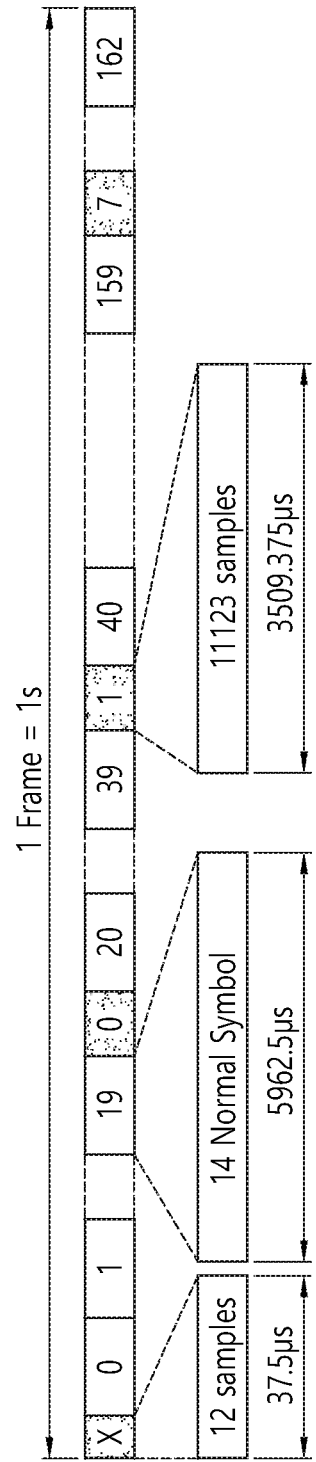
FIG. 10 shows an example of a frame structure for CIoT according to an embodiment of the present invention.

FIG. 10 shows an example of a frame structure for CIoT according to an embodiment of the present invention. If such frame structure is used, the handling with legacy TDD DL/UL configuration or configuration of TDD operation may be little bit different. For example, when the frame structure shown in FIG. 10 is used, it is easily not feasible to align with legacy TDD DL/UL configuration. Particularly, in case of TDD DL/UL configuration 0 where DL subframe less than only 2 ms are used, it is difficult to avoid collision between DL of CIoT carrier and UL subframes of LTE TDD carrier. In such a case, a gap between two adjacent carriers may be necessary to avoid interference. Further, it may also be necessary to restrict the power. Alternatively, the maximum length of synchronization signal may be restricted as less than 2 ms (normal subframe+DwPTS). For example, primary synchronization signal (PSS) and secondary synchronization signal (SSS) may be present in 10 ms window where each signal is aligned with subframe 0/1 and subframe 5/6 in LTE TDD carrier. The gap between PSS/SSS may become 5 ms and the duration of each signal may be less than 2 ms.

Meanwhile, when lower power is used shown above in case 3-1, 3-4 or 3-5, at least one of the following approaches may be considered to meet the system performance.

(1) The frame duration and slot duration may be increased. This may require some impact on the mapping between synchronization signal, broadcast channel such as PBCH, etc. Thus, in general, this may require some further design. To apply this approach, a frame structure may be specified depending on a maximum power that the network can use.

(2) The repetition may be adopted. For example, if 43 dBm is the maximum power and is reduced to 40 dBm due to interference, ×2 times repetition may be needed. Accordingly, every signal/channel may be repeated twice, e.g. per slot basis. If it is assumed that a frame consists of k slots where PSS, SSS may be mapped to one slot respectively (or jointly), the required number of repetitions may be different depending on the power reduction. For example, if repetition factor is r, the frame length may become r times longer, and each signal/channel may repeated r times each. If PSS is transmitted i-th slot in every frame, with the repetition, PSS may be transmitted r*i-th slot to (r+1)*i−1 th slot, where the length of one effective frame becomes r times longer. To avoid any confusion by a UE in terms of cell search, either master information system block may be transmitted per frame (without repetition) or the power reduction or repetition factor r may be scrambled in PSS/SSS such that the UE can identify the frame structure.

(3) A UE may aggregate repetition over r frames. If the system utilizes r(>1) to compensate its maximum power, a UE may aggregate multiple frames to acquire the transmission.

(4) A UE may choose coverage class in consideration of reduced maximum power.

Compared to high power network, higher coverage class may be selected if coverage class is selected based on SINR values rather than the coverage enhancement it would require. To allow this, system information may be designed such that it can work with reduced power up to a certain threshold. In such a case, the maximum supported minimum coupling loss (MCL) by the network may be reduced.

Figure 11:
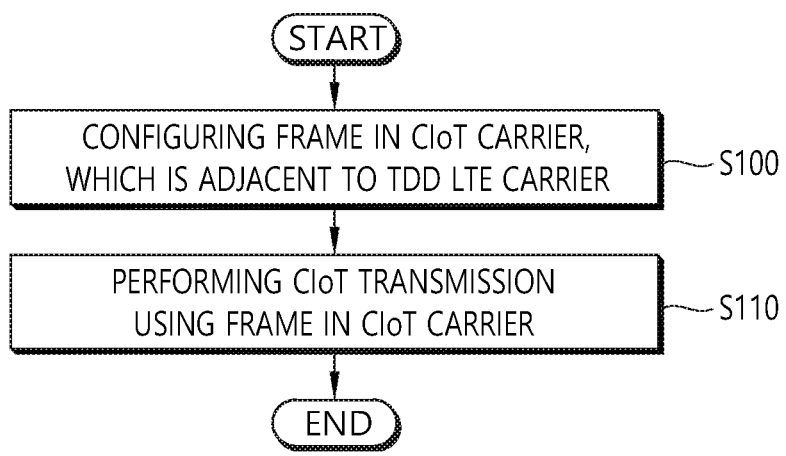
FIG. 11 shows a method for performing, by a BS, CIoT transmission according to an embodiment of the present invention.

FIG. 11 shows a method for performing, by a BS, CIoT transmission according to an embodiment of the present invention. This embodiment corresponds to case 3-5 or 3-7 described above.

In step S100, the BS configures a frame in a CIoT carrier which is adjacent to a TDD LTE carrier. In step S110, the BS performs the CIoT transmission using the frame in the CIoT carrier.

A DL of the CIoT carrier may be adjacent to the TDD LTE carrier, which corresponds to case 3-5 described above. In this case, the CIoT transmission may be performed only in a time duration in the frame which collides with DL subframes and DwPTS of the TDD LTE carrier. Alternatively, the CIoT transmission may be performed by using a reduced transmission power. Alternatively, the CIoT transmission is performed by using a first transmission power which corresponds to a first time duration colliding with DL subframes of the TDD LTE carrier and a second transmission power which corresponds to a second time duration colliding with uplink (UL) subframes of the TDD LTE carrier. The first transmission power and the second transmission power may be configured according to a TDD DL/UL configuration of the TDD LTE carrier. The first transmission power may be larger than the second transmission power.

Or, a DL and UL of the CIoT carrier may be adjacent to the TDD LTE carrier, which corresponds to case 3-7 described above. In this case, a frame structure of the CIoT carrier may be aligned with a frame structure of the TDD LTE carrier. The frame structure of the CIoT may be configured according to a TDD DL/UL configuration of the TDD LTE carrier.

Figure 12:
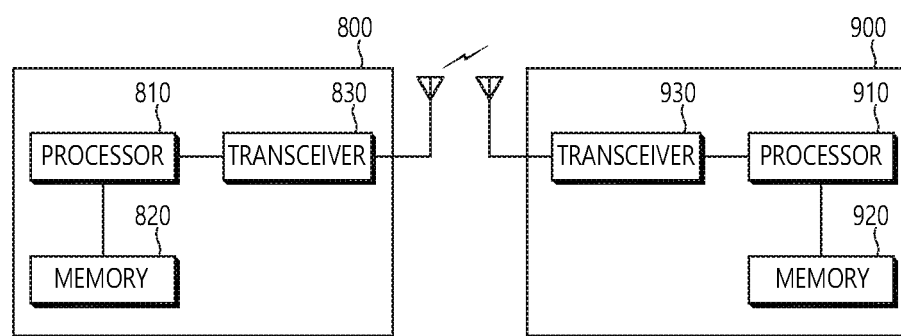
FIG. 12 shows a wireless communication system to implement an embodiment of the present invention.

FIG. 12 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a base station (BS) in a wireless communication system, the method comprising:

identifying a cellular internet-of-things (CIoT) carrier which is adjacent, in frequency domain, to a time division duplex (TDD) long-term evolution (LTE) carrier;

determining a power for a CIoT transmission based on a gap between the CIoT carrier and the TDD LTE carrier, wherein the power is lower than a maximum power for the CIoT transmission; and performing the CIoT transmission over the CIoT carrier based on the determined power in one or more time intervals in which at least one of downlink (DL) subframe or downlink pilot time slot (DwPTS) is located on a frame of the TDD LTE carrier, wherein the one or more time intervals are determined based on a TDD configuration of the frame of the TDD LTE carrier, wherein a maximum length of each primary synchronization signal (PSS) and secondary synchronization signal (SSS), within a 10-millisecond (ms) window of the CIoT transmission, is restricted as less than 2 ms, and a gap between the PSS and the SSS is set to 5 ms, wherein a value of the determined power is scrambled in the PSS or the SSS, and wherein a coverage class is selected, at a receiver of the CIoT transmission, according to the value of the determined power.

2. The method of claim 1, wherein a downlink (DL) of the CIoT carrier is adjacent to the TDD LTE carrier.

3. The method of claim 2, further comprising:

performing the CIoT transmission over the CIoT carrier based on another power in one or more time intervals in which an uplink (UL) subframe is located on the frame of the TDD LTE carrier.

4. The method of claim 3, wherein the determined power and the other power are configured based on the TDD configuration of the frame of the TDD LTE carrier.

5. The method of claim 3, wherein the determined power is larger than the other power.

6. The method of claim 1, wherein a DL and an uplink (UL) of the CIoT carrier is adjacent to the TDD LTE carrier.

7. The method of claim 6, wherein a frame structure of the CIoT carrier is aligned with a frame structure of the TDD LTE carrier.

8. The method of claim 7, wherein the frame structure of the CIoT is configured based on the TDD configuration of the frame of the TDD LTE carrier.

9. A base station (BS) in a wireless communication system, the BS comprising:
    a memory;
    a transceiver; and
    at least one processor coupled to the memory and the transceiver, and configured to:
    identify a cellular internet-of-things (CIoT) carrier which is adjacent, in frequency domain, to a time division duplex (TDD) long-term evolution (LTE) carrier;
    determine a power for a CIoT transmission based on a gap between the CIoT carrier and the TDD LTE carrier, wherein the power is lower than a maximum power for the CIoT transmission; and
    control the transceiver to perform the CIoT transmission over the CIoT carrier based on the determined power in one or more time intervals in which at least one of downlink (DL) subframe or downlink pilot time slot (DwPTS) is located on a frame of the TDD LTE carrier,
    wherein the one or more time intervals are determined based on a TDD configuration of the frame of the TDD LTE carrier,
    wherein a maximum length of each primary synchronization signal (PSS) and secondary synchronization signal (SSS), within a 10-millisecond (ms) window of the CIoT transmission, is restricted as less than 2 ms, and a gap between the PSS and the SSS is set to 5 ms,
    wherein a value of the determined power is scrambled in the PSS or the SSS, and
    wherein a coverage class is selected, at a receiver of the CIoT transmission, according to the value of the determined power.

10. The BS of claim 9, wherein a downlink (DL) of the CIoT carrier is adjacent to the TDD LTE carrier.

11. The BS of claim 9, wherein a DL and an uplink (UL) of the CIoT carrier is adjacent to the TDD LTE carrier.

12. The BS of claim 11, wherein a frame structure of the CIoT carrier is aligned with a frame structure of the TDD LTE carrier.

13. The BS of claim 10, wherein the at least one processor is further configured to perform the CIoT transmission over the CIoT carrier based on another power in one or more time intervals in which an uplink (UL) subframe is located on the frame of the TDD LTE carrier.

14. The BS of claim 13, wherein the determined power and the other power are configured based on the TDD configuration of the frame of the TDD LTE carrier.

15. The BS of claim 13, wherein the determined power is higher than the other power.

* * * * *